United States Patent [19]
Dix et al.

[11] 3,973,645
[45] Aug. 10, 1976

[54] INFLATABLE EVACUATION SLIDE

[75] Inventors: Earl E. Dix, Colts Neck; William H. Fischer, Wall, both of N.J.

[73] Assignee: The Garrett Corporation, Los Angeles, Calif.

[22] Filed: Aug. 15, 1975

[21] Appl. No.: 605,140

[52] U.S. Cl. .............................. 182/48; 193/25 B
[51] Int. Cl.² .................... B65G 11/10; A62B 1/20
[58] Field of Search ............... 182/48, 49; 193/25 B; 244/137 P

[56] References Cited
UNITED STATES PATENTS

| | | | |
|---|---|---|---|
| 3,692,144 | 9/1972 | Summer | 182/48 |
| 3,845,920 | 11/1974 | Satterfield | 193/25 B |
| 3,897,861 | 8/1975 | Miller | 193/25 B |

Primary Examiner—Reinaldo P. Machado
Attorney, Agent, or Firm—Albert J. Miller

[57] ABSTRACT

Disclosed is a generally five-sided inflatable evacuation slide in which one corner of the slide is supported on the aircraft wing surfaces and the sliding surface is both banked and canted away from the elevated egress of the aircraft.

6 Claims, 13 Drawing Figures

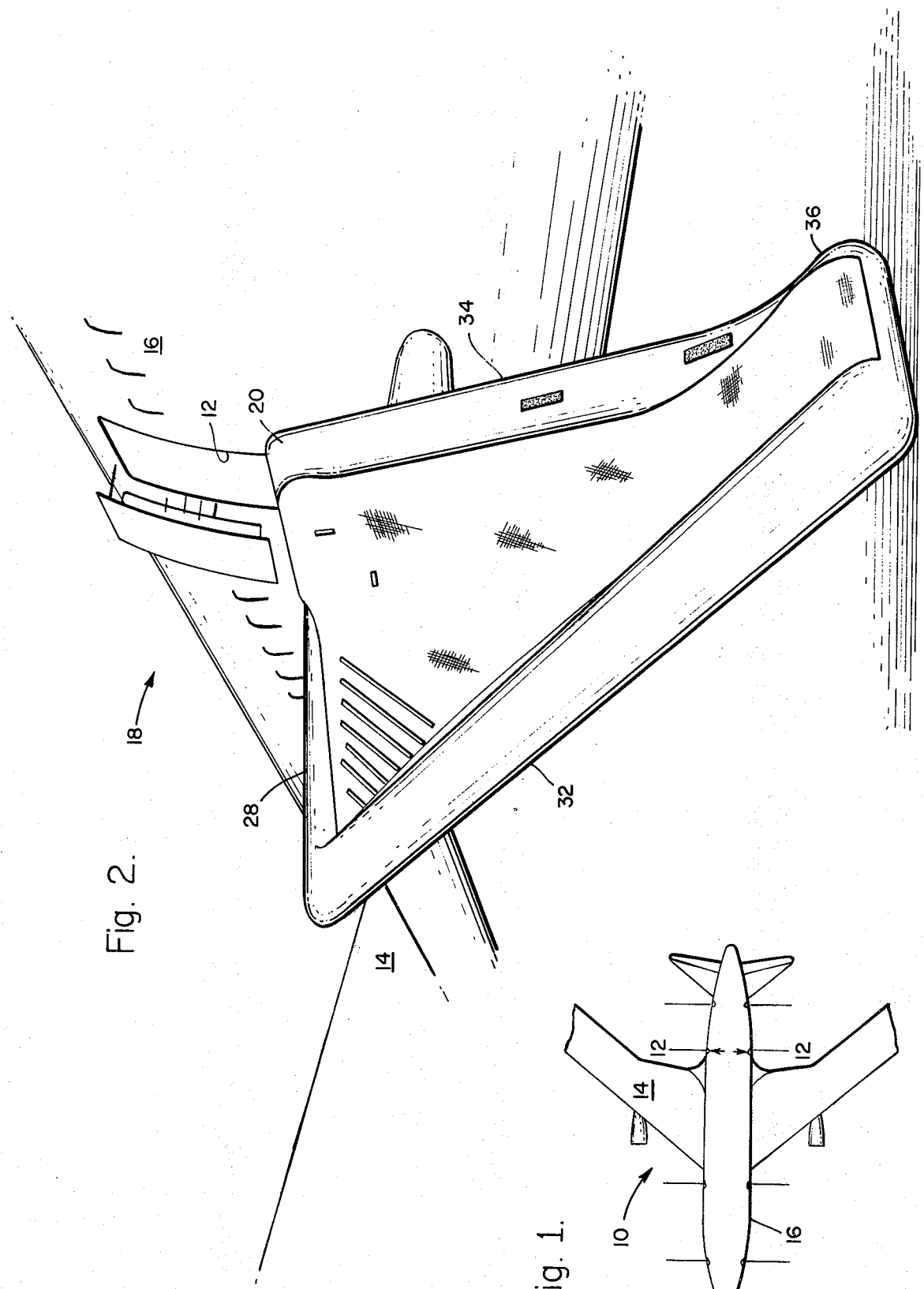

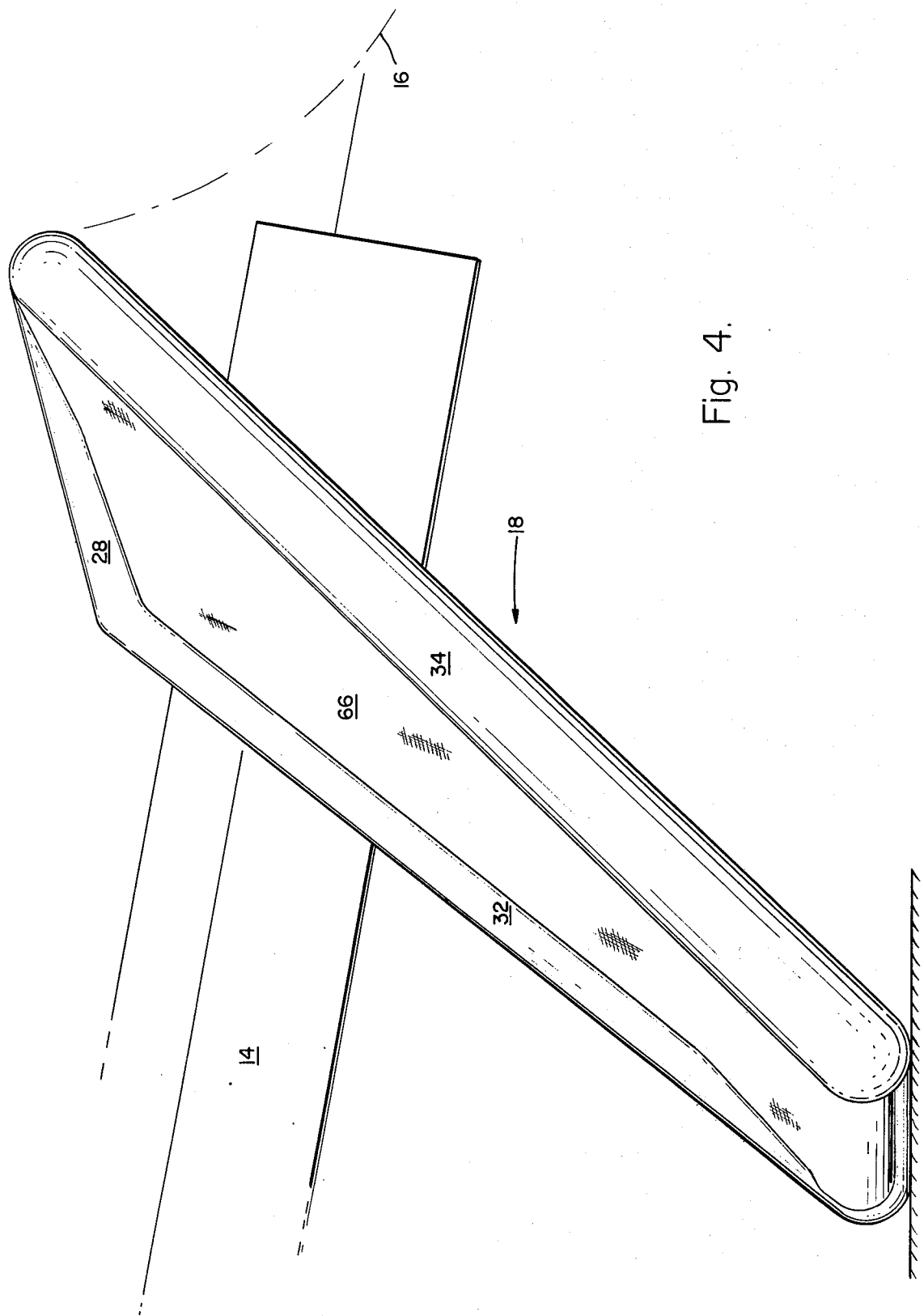

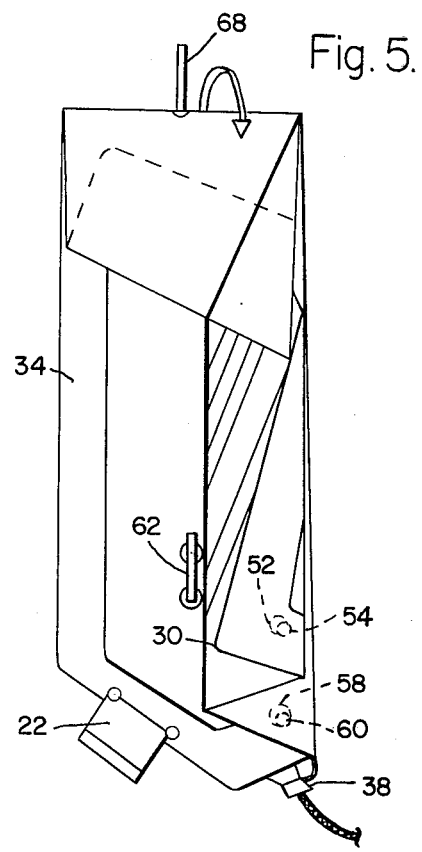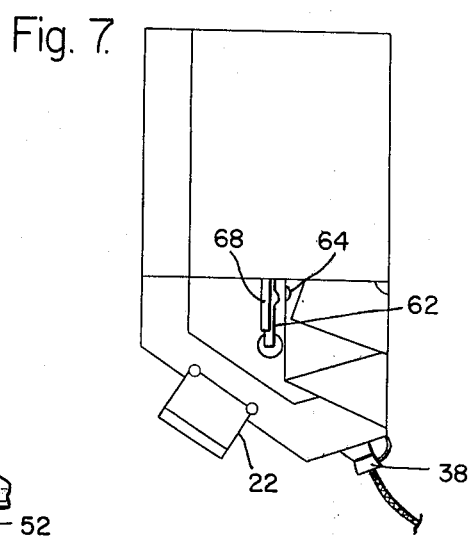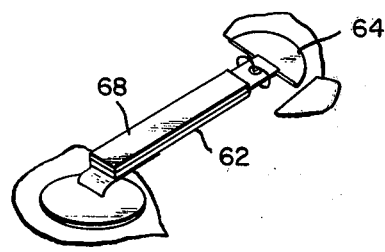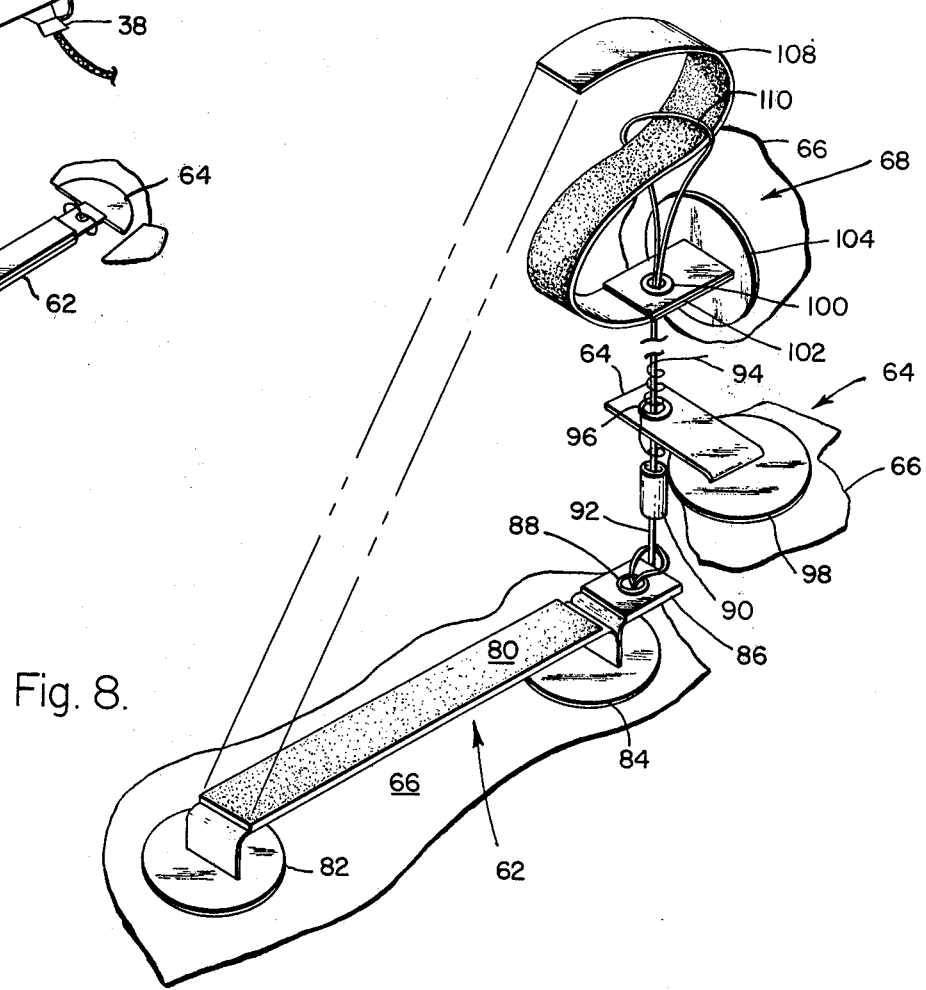

INFLATABLE EVACUATION SLIDE

BACKGROUND OF THE INVENTION

Inflatable evacuation slides and/or slide rafts are now installed on substantially all passenger-carrying aircraft to provide a means for rapid evacuation from the aircraft in the event of an emergency. These inflatable evacuation devices are normally folded in an uninflated condition into a pack requiring a minimum of space in the interior of the aircraft door or immediately adjacent thereto. With the aircraft door closed, a girt bar extending from the inflatable evacuation slide, is connected to brackets on the floor inside the aircraft doorway such that in the event of an emergency it is only necessary to open the aircraft door to automatically deploy the slide. With the opening door, the girt bar will pull the evacuation slide from its container thereby allowing the slide to fall through the now open doorway. Subsequently, the evacuation slide is rapidly inflated and is then ready for the evacuation of passengers within a very short period of time following the opening of the door.

In the normal situation, the aircraft door is situated so that the inflatable evacuation slide can extend directly outward therefrom with the bottom of the slide resting on a lower surface to provide a straight-line sliding surface from the aircraft door to the lower surface. An example of this type of slide can be found in U.S. Pat. No. 3,595,357.

There are some situations, however, in which the aircraft door opens out onto the aircraft wing. In this case it is normal to provide a walkway on the wing and to have the inflatable evacuation slide extend to the ground from the walkway. An example of this type of evacuation slide can be found in U.S. Pat. No. 3,692,144. Where, however, there is not an unobstructed path from the aircraft door to the lower surface upon which the aircraft is at rest or the aircraft door does not open out onto the wing surface, neither of the two above-mentioned types of slides can be utilized. An example of this situation would be a door located a short distance aft from where the aircraft wing is attached to the aircraft fuselage. Since the wing normally extends backward at an acute angle from the aircraft fuselage, the wing surfaces would normally interfere with the deployment of an evacuation slide from a door such as this.

SUMMARY OF THE INVENTION

The present invention is directed towards an inflatable evacuation system to be deployed from an aircraft exit situated just aft of where the aircraft wing is attached to the aircraft fuselage. The evacuation slide is generally pentagonal in shape, having an inflatable beam extending therearound. One corner of the inflatable beam is adapted to rest on the wing surface and to be supported thereby. A deployment system is provided to insure that the inflatable evacuation slide will deploy to achieve the necessary configuration with one corner resting on the wing. The slide is both canted and banked away from the aircraft wing such that a passenger exiting from the aircraft is turned to slide at an angle generally perpendicular to the aircraft exit.

BRIEF DESCRIPTION OF THE DRAWINGS

FIG. 1 is a schematic plan view of an aircraft having doors located to require the use of the inflatable evacuation slide of the present invention.

FIG. 2 is a perspective view of the inflated evacuation slide of the present invention.

FIG. 4 is a rear end view of the inflated evacuation slide of the present invention.

FIG. 5 is a schematic view of the evacuation slide of the present invention shown in a partially folded, uninflated condition.

FIG. 6 is an enlarged schematic view of the secondary tie restraint for the evacuation slide of the present invention.

FIG. 7 is a schematic view of the evacuation system of the present invention shown in a still further folded, uninflated, position.

FIG. 8 is an exploded view of the primary half-tie release of the inflatable evacuation slide of the present invention.

FIG. 9 is a schematic view of the primary half-tie release of FIG. 8 shown in its engaged position.

DESCRIPTION OF THE EMBODIMENTS

Illustrated in FIG. 1 is a schematic drawing of an aircraft 10 having a pair of doors 12 located just aft of where the aircraft wings 14 are attached to the aircraft fuselage 16. It is door locations such as these for which the inflatable evacuation slide of the present invention has been developed.

Figure 3:
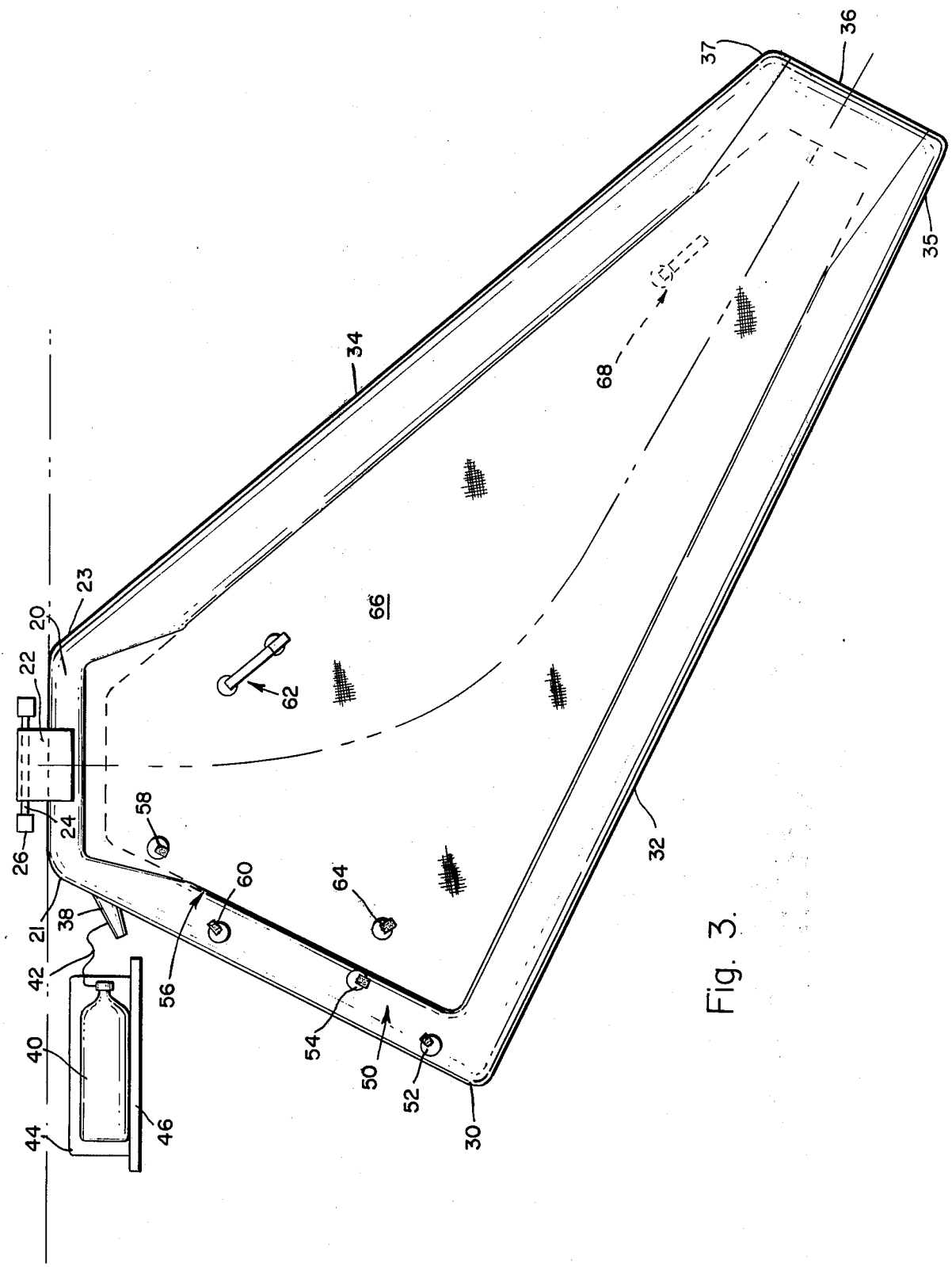
FIG. 3 is a top plan view of the inflated evacuation slide of the present invention.
Figure 10:
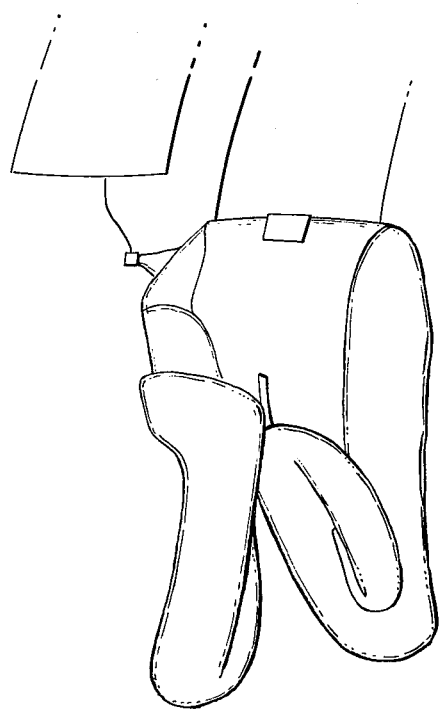
FIG. 10 is a schematic view of the inflatable evacuation slide of the present invention shown in an initial partially inflated position.

As illustrated in FIGS. 2, 3, and 4, the inflatable evacuation slide 18 is generally five-sided in shape, thus having five corners. The slide 18 generally comprises an inflatable tube or beam which extends around the entire periphery of the slide and a sliding surface 66 generally joined to the interior peripheral of the beam.

The inflatable beam includes a generally horizontal sill section 20 situated immediately below the aircraft doorway 12. It is to this horizontal sill beam section 20 to which is attached the girt 22, including girt bar 24 which can, in turn, be attached to the floor of the aircraft 10 by means of brackets 26. Extending outward from the aircraft from the forward sill beam corner 21 is the wing section 28 of the beam. Wing beam section 28 is also generally horizontal with its outward corner 30 resting upon the aircraft wing 14. An outboard longitudinal beam section 32 extends from the outward corner 30 to the ground. An inboard longitudinal beam section 34 extends from the aft sill beam corner 23 to the ground. A bottom beam section 36 extends between outboard longitudinal beam section lower end 35 and the inboard longitudinal beam section lower end 37 to complete the integral peripheral beam which can be inflated from a single source. The wing beam section 28 includes an aspirator 38 to receive compressed air from a compressed air source 40 through line 42. The compressed air source 40 may be mounted in the packboard 44 from which the inflatable evacuation slide 18 is ejected. As shown, the packboard 44 is mounted on the aircraft door 46. An example of an appropriate packboard and inflatable evacuation slide ejection system can be found in U.S. Ser. No. 464,022, entitled "Inflatable Deployment and Method", filed Apr. 25, 1974, and assigned to the same assignee as this application.

In order to deploy the inflatable evacuation slide 18 to insure that outer wing beam corner 30 will come to rest upon the aircraft wing 14 and that the bottom beam section 36 will rest upon the lower surface on which the aircraft 10 is at rest, it is necessary to provide a deployment system for the slide. This deployment system generally comprises a first secondary restraint 50 comprising a female Velcro fastener 52 and a male Velcro fastener 54, and a second secondary restraint 56 having male Velcro fastener 58 and a female Velcro fastener 60. Both the first and second secondary restraints 50 and 56 are mounted on the wing beam section 28. The primary or half-tie restraint includes the female half-tie release 62 and a grommet tab assembly 64 both situated on the sliding surface 66 and a male half-tie release 68 situated on the underside of the slide surface 66.

In order to more fully understand the deployment system, reference is made to FIGS. 5 through 9 which generally illustrate the folding of the uninflated evacuation slide 18. As shown in FIG. 5, the outer wing beam corner 30 is folded in two sections toward the inboard longitudinal beam section 34 to engage the male and female members 52 and 54 of the first secondary restraint 50 and the male and female members 58 and 60 of the second secondary restraint 56. Details of the engagement of the secondary restraints are illustrated in FIG. 6.

In addition, the runway or bottom end of the evacuation slide 18 is folded toward the top in the manner shown in FIG. 5 so as to expose the male half-tie release 68, the engagement of which is best shown in FIGS. 7, 8, and 9. By further upward folding of the runway end of the inflatable evacuation slide, the male primary half-tie release 68 and the grommet tab assembly 64 are aligned with the female primary half-tie release 62.

As best illustrated in FIG. 8, the female primary half-tie release 62 generally comprises a Velcro pile fastener 80 secured to the sliding surface 66 by means of circular patches 82 and 84. A tab 86 having a grommet 88 also extends from patch 84. A frangible line 90 is attached to the tab 86 by means of a looped nylon thread 92. Nylon thread 94 which is affixed to the other end of the frangible link 90 extends through the grommet 96 in grommet tab 64 which is attached to the sliding surface 66 by means of patch 98. The male primary release 68 includes grommet 100 in tab 102 which is attached to the under side of the slide surface 66 by means of a circular patch 104. A Velcro hook fastener 108 extends outward from the tab 102. The nylon thread 94 from the frangible link 90 extends through the grommet 100 and is held by means of loop 110. The assembled primary half-tie release is shown in FIG. 9.

FIGS. 10 through 13 illustrate four intermediate deployment positions for the inflatable evacuation slide following ejection from the aircraft and before full inflation. In the initial partially inflated condition of FIG. 10, none of the restraints have released since sufficient inflation pressure has not built up in the inflatable evacuation slide.

Figure 11:
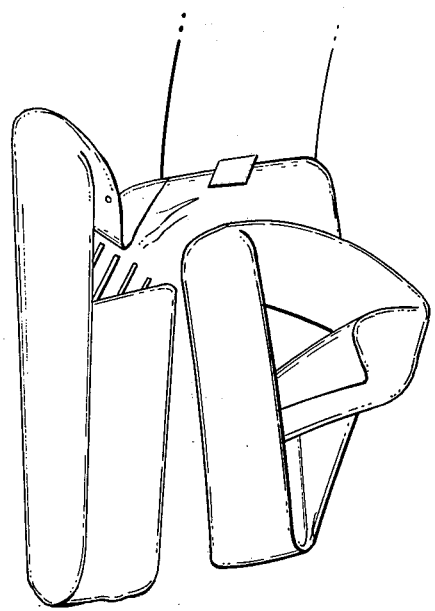
FIG. 11 is a schematic view of the inflatable evacuation slide of the present invention shown in an intermediate partially inflated position.
Figure 12:
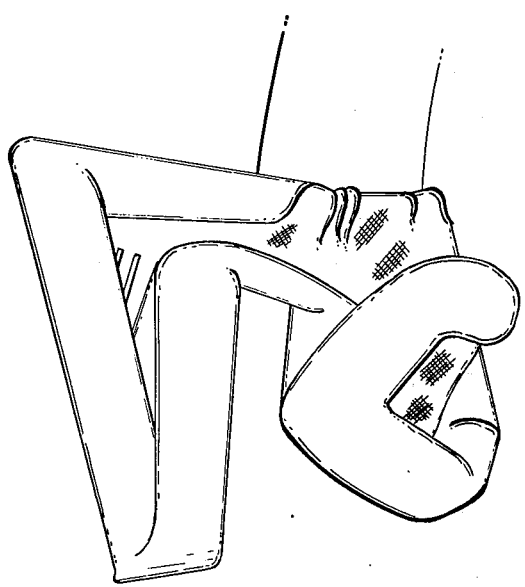
FIG. 12 is a schematic view of the inflatable evacuation slide of the present invention shown in a further partially inflated position.
Figure 13:
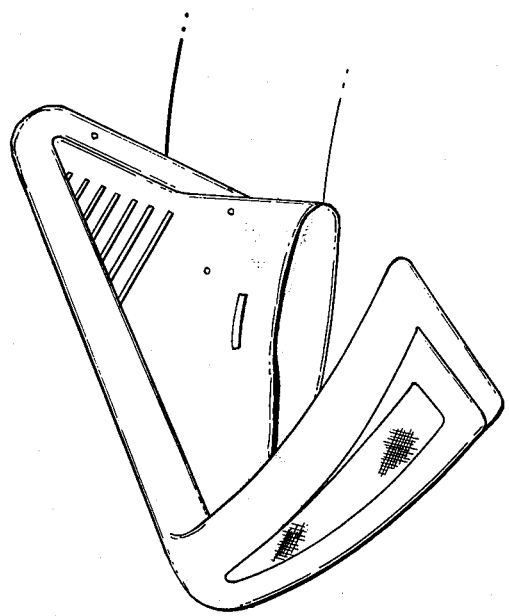
FIG. 13 is a schematic view of the inflatable evacuation slide of the present invention shown in an almost fully inflated position.

FIG. 11, an intermediate inflation stage, illustrates the general configuration of the partially inflated evacuation slide following release of the first secondary restraint, while FIG. 12 illustrates the position of the slide immediately following release of the primary restraint which permits corner 30 to rest upon the wing surface. FIG. 13 illustrates the almost fully inflated evacuation slide just prior to the lower end of the slide reaching the lower surface upon which the aircraft is at rest.

What we claim is:

1. Inflatable slide apparatus for evacuation from an elevated egress of an aircraft to a lower surface upon which the aircraft is at rest where the egress is located near an aircraft wing, comprising:
    a fluid distensible beam structure generally including five beam sections in fluid communication with each other to form a generally pentagonal beam structure;
    a sliding surface operably affixed to the generally pentagonal fluid distensible beam structure;
    means to deploy the fluid distensible beam structure and sliding surface from the elevated egress to have a portion of the pentagonal beam structure supported by the aircraft wing and one of the five pentagonal beam sections disposed on the lower surface upon which the aircraft is at rest.

2. Inflatable slide apparatus for evacuation from an elevated egress of an aircraft to a lower surface upon which the aircraft is at rest where the egress is located near an aircraft wing, comprising:
    a fluid distensible beam structure generally including five beam sections in fluid communication with each other to form a generally pentagonal shaped beam structure, a first beam section disposed adjacent the elevated egress and operably connected thereto, a second beam section extending outward from the elevated egress to the aircraft wing, a third beam section disposed on the lower surface upon which the aircraft is at rest, a fourth beam section extending from the second beam section to the third beam section, and a fifth beam section extending between the first beam section and the third beam section;
    a sliding surface operably affixed to the generally pentagonal shaped fluid distensible beam structure;
    means to deploy the fluid distensible beam structure and sliding surface from the elevated egress to have a portion of the pentagonal beam structure supported by the aircraft wing.

3. Inflatable slide apparatus for evacuation from an elevated egress of an aircraft to a lower surface upon which the aircraft is at rest where the egress is located near an aircraft wing, comprising:
    a fluid distensible member of a generally elongate configuration when fully inflated, disposed in an uninflated, folded configuration at the elevated egress with one end secured thereto, said member generally comprising a generally pentagonal shaped fluid distensible beam having a sliding surface operably affixed thereto, said pentagonal shaped fluid distensible beam having five beam sections in fluid communication with each other, including, when inflated, a sill beam section disposed at the elevated egress and operably secured thereto, a wing beam section extending outward from one end of the sill beam section to the aircraft wing, a bottom beam section disposed on the lower surface upon which the aircraft is at rest, an inboard longitudinal beam section extending from the other end of the sill beam section to the inboard end of the bottom beam section, and an outboard longitudinal beam section extending from the wing beam section to the outboard end of the bottom beam section;

means to deploy the fluid distensible member from the elevated egress to have a portion of the pentagonal beam structure supported by the aircraft wing.

4. The inflatable slide apparatus of claim 3 wherein said means to deploy the fluid distensible member from the elevated egress include means to delay the extension of the inboard and outboard longitudinal beam sections until the wing beam section is fully extended over the aircraft wing.

5. A method of deploying an elongate inflatable evacuation slide from an elevated egress of an aircraft where the egress is situated near an aircraft wing, comprising the steps of:

storing a generally five-sided evacuation slide in a folded, uninflated configuration at the elevated egress;

attaching one end of the folded, uninflated, slide to the elevated egress;

inflating the evacuation slide from the elevated egress, and providing means on the evacuation slide to sequentially unfold the slide to support a portion of the inflated evacuation slide on the aircraft wing.

6. A method of deploying an elongate inflatable evacuation slide from an elevated egress of an aircraft where the egress is situated near an aircraft wing, comprising the steps of:

storing a generally pentagonal evacuation slide in a folded, uninflated configuration at the elevated egress, the evacuation slide generally comprising a fluid distensible beam having five beam sections in fluid communication with each other and a sliding surface operably affixed thereto, one section of the fluid distensible beam adapted to be disposed on the aircraft wing;

attaching one end of the folded, uninflated, slide to the elevated egress;

inflating the evacuation slide from the elevated egress, and providing means on the evacuation slide to restrain deployment of the other end of the slide until the one section of the slide is disposed over the aircraft wing.

* * * * *